United States Patent [19]

Akkapeddi et al.

[11] 4,156,708

[45] May 29, 1979

[54] POLY(HYDROXYMETHYLENE) FIBERS AND FILMS AND PROCESS OF MAKING

[75] Inventors: Murali K. Akkapeddi, Succasunna; Herbert K. Reimschuessel, Morristown, both of N.J.

[73] Assignee: Allied Chemical Corporation, Morris Township, Morris County, N.J.

[21] Appl. No.: 858,509

[22] Filed: Dec. 8, 1977

Related U.S. Application Data

[62] Division of Ser. No. 712,108, Aug. 5, 1976, Pat. No. 4,076,680.

[51] Int. Cl.$^2$ .................................................. D01F 6/00
[52] U.S. Cl. ...................................... 264/184; 264/203
[58] Field of Search ................... 260/32.6 R, 29.6 H, 260/29.6 MN, 29.6 N, 77.5 UA; 264/184, 203

[56] References Cited

U.S. PATENT DOCUMENTS

| Re. 24,691 | 8/1959 | Steuber | 264/184 |
| 2,955,017 | 10/1960 | Boyer | 264/183 |
| 3,344,102 | 9/1967 | Huffman et al. | 260/29.6 M |

*Primary Examiner*—Jay H. Woo
*Attorney, Agent, or Firm*—Robert A. Harman; Gerhard H. Fuchs

[57] ABSTRACT

Solutions in substantially anhydrous hydrazine of poly(-hydroxymethylene) and copolymers of hydroxymethylene with up to about 30 mol percent of ethylenically unsaturated comonomers are suitable for solution spinning to make filaments, i.e. fibers and film.

5 Claims, No Drawings

POLY(HYDROXYMETHYLENE) FIBERS AND FILMS AND PROCESS OF MAKING

This is a division of Application Ser. No. 712,108, filed Aug. 5, 1976 now U.S. Pat. No. 4,076,680.

BACKGROUND OF THE INVENTION

The present invention provides solutions in substantially anhydrous hydrazine of poly(hydroxymethylene), of copolymers of hydroxymethylene with up to about 30 mol percent of ethylenically unsaturated comonomers, and of mixtures thereof and a method for making filaments, i.e. fibers and film, from such solutions by introducing such solutions into a spinning bath comprising a hydrazine-miscible non-solvent for the polymer to precipitate the polymer in fiber or film form.

Vinylene carbonate, an unsaturated, cyclic 1,2-substituted ethylene derivative of the formula,

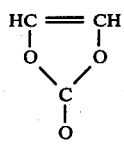

was first prepared and polymerized by M. S. Newman and R. W. Addor (J. Am. Chem. Soc. 75, 1263 (1953) and J. Am. Chem. Soc. 77, 3789 (1955)). Poly(vinylene carbonate) is readily hydrolyzed in basic and acidic media to produce poly(hydroxymethylene) in the form of intractible white powder. Poly(hydroxymethylene) is composed of recurring units of the formula

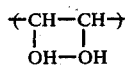

N. D. Fields and J. R. Schaefgen investigated properties of poly(hydroxymethylene) and reported that poly(hydroxymethylene) obtained by hydrolysis of poly(vinylene carbonate) in strong base or aqueous ammonia is a white powdery material soluble only in 30 percent aqueous sodium hydroxide and in sulfuric acid. They found that their high molecular weight polymer was not dissolved but only swollen by hot dimethyl sulfoxide and molten urea. Since the polymer was infusible and could not be fabricated into fibers and films using conventional methods, they made poly(hydroxymethylene) films for determination of mechanical properties of the polymer by first preparing a film of poly(vinylene carbonate) and then hydrolizing the poly(vinylene carbonate) film to obtain film of poly(hydroxymethylene) (J. Polymer Sci. 58, 533 (1962)).

Klimova et al. have reported that poly(hydroxymethylene) in soluble in hydrazine hydrate ($N_2H_4 \cdot H_2O$) in addition to being soluble in concentrated alkali and fused urea (Zh. Prikl. Khim. 37, 1152 (1964)). Klimova et al. have further reported that poly(hydroxymethylene) is insoluble in 50 percent hydrazine, which acts only as a swelling agent, while copolymers thereof, containing 12.6 to 54.5 percent of 1,2-glycol groups, with vinyl alcohol are soluble in this medium (Zh. Prikl. Khim. 38, 2866 (1965)).

Copolymers of vinylene carbonate with ethylenically unsaturated comonomers have, for example, been disclosed in U.S. Pat. No. 2,722,525 to Price et al. and U.S. Pat. Nos. 2,847,398 and 2,847,401, both to Gluesensamp et al. Such vinylene carbonate copolymers have been hydrolyzed to form the corresponding hydroxymethylene copolymers.

Huffman et al. in U.S. Pat. No. 3,344,102 have disclosed solutions of poly(hydroxymethylene) and of copolymers of hydroxymethylene with certain ethylenically unsaturated comonomers, including vinyl acetate, vinyl chloride, vinyl fluoride, acrylonitrile and acrylamide, in aqueous solution of zinc chloride, which solutions, they stated, are useful for fiber and film formation.

It is an object of the present invention to provide solutions of poly(hydroxymethylene), including poly(hydroxymethylene) of high molecular weight and of copolymers of hydroxymethylene with ethylenically unsaturated comonomers.

It is another object of the present invention to provide a method for making fibers and film of poly(hydroxymethylene), of copolymers of hydroxymethylene with ethylenically unsaturated copolymers, and of mixtures thereof.

SUMMARY OF THE INVENTION

In accordance with the present invention, there are provided solutions in hydrazine critically containing not more than about 10 percent by weight of water, based on the combined weight of water and hydrazine, of polymers selected from the group consisting of (a) poly(hydroxymethylene), (b) copolymers of hydroxymethylene with up to about 30 mol percent of ethylenically unsaturated comonomers, and (c) mixtures thereof.

The present invention further provides a method for making filaments, i.e. fibers and film, of polymers selected from the group consisting of (a) poly(hydroxymethylene), (b) copolymers of hydroxymethylene with up to about 30 mol percent of ethylenically unsaturated comonomers, and (c) mixtures thereof by introducing a spinning solution comprising a solution of such polymer in hydrazine containing not more than about 10 percent by weight of water, based on the combined weight of hydrazine and water, by means of an orifice into a spinning bath comprising a hydrazine-miscible non-solvent for the polymer to precipitate the polymer in fiber or film form from the spinning solution.

Furthermore, the present invention provides a method for obtaining a solution in a substantially anhydrous hydrazine of a polymer selected from the group consisting of poly(hydroxymethylene) and copolymers of hydroxymethylene with up to about 30 mol percent of ethylenically unsaturated comonomer which comprises dissolving a precursor polymer selected from the group consisting of poly(vinylene carbonate) and copolymers of vinylene carbonate with up to about 30 mol percent of ethylenically unsaturated comonomer in hydrazine, containing not more than about 10 percent by weight of water, based on the combined weight of water and hydrazine. Transformation of the precursor polymer into the desired polymer is aided by heating the solution above ambient temperature up to the boiling point of the solution, under superatmospheric pressure, if desired, preferably under an inert gas blanket until transformation is completed, typically for periods of about 5 minutes to 5 or 10 hours, depending on temperature.

DETAILED DESCRIPTION OF THE INVENTION AND OF THE PREFERRED EMBODIMENTS

Poly(hydroxymethylene) and copolymers of hydroxymethylene containing up to about 30 mol percent of ethylenically unsaturated comonomers may be prepared by polymerizing poly(vinylene carbonate), or poly(vinylene carbonate) together with ethylenically unsaturated comonomer, by known methods in bulk, solution, suspension or dispersion, under atmospheric or superatmospheric pressure, in the presence of a free radical generating initiator to obtain as precursor polymer poly(vinylene carbonate) or copolymers of vinylene carbonate with ethylenically unsaturated comonomers, followed by hydrolysis of the precursor polymer to obtain poly(hydroxymethylene) or copolymers of hydroxymethylene with ethylenically unsaturated comonomers. Preparation of the poly(vinylene carbonate) and copolymers of vinylene carbonate with ethylenically unsaturated comonomers has, for example, been described in the references discussed above under Background of the Invention.

Ethylenically unsaturated comonomers for making copolymers thereof with vinylene carbonate have, for example, been described by Price et al. in U.S. Pat. No. 2,722,525. These comonomers include compounds of the formula $CH_2=CRR'$, wherein R may be hydrogen, halogen, alkyl, cycloalkyl or aryl radicals, and R' may be aryl and alkaryl radicals, or radicals of the formulas

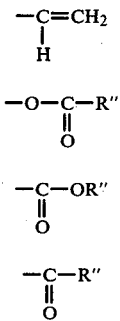

wherein R" may be alkyl, alkoxyalkyl, or a carbocyclic radical. Exemplary comonomers of the formula $CH_2=CRR'$ include those wherein R is hydrogen; a halogen, such as fluorine, chlorine, bromine or iodine; alkyl, for example, methyl, ethyl, propyl, butyl, 2-octadecyl, etc.; cycloalkyl such as cyclopentyl, cyclohexyl, cycloheptyl, etc.; aryl, for example, phenyl, xenyl, naphthyl etc.; alkaryl, for example tolyl, xylyl, ethylphenyl, etc.; and aralkyl, for example, benzyl, phenylethyl, etc.; and wherein R' may be a radical of any of the above shown formulas wherein R" may be alkyl, alkoxyalkyl, for example, methoxymethyl, methoxyethyl, ethoxypropyl, propoxybutyl, etc.; or a carbocyclic radical, for example, aryl, alkaryl, or hydroaromatic, etc.

Exemplary compounds of the formula $CH_2=CRR'$ include vinyl esters, for example, vinyl acetate, vinyl propionate, vinyl butylate, etc.; methyl vinyl ketone; ethyl vinyl ketone; isoprene, 1,3-butadiene; 2-chloro-1,3-butadiene; various esters of acrylic acid, for example methyl acrylate, ethyl acrylate, cyclooxyl acrylate, tetrahydronaphthyl acrylate, decahydronaphthyl acrylate, methoxyethyl acrylate, ethoxyethyl acrylate, and the like.

Suitable comonomers further include ethylene and halo-substituted ethylene, such as vinyl and vinylene halides, e.g. vinyl chloride, vinyl fluoride, vinyl bromide, vinyl iodide, vinylene chloride, vinylene fluoride, 1-fluoro-1-chloroethylene, 1-fluoro-1-bromoethylene, vinylene bromide, also comonomers of the formula $CF_2=CXY$, wherein X may be hydrogen, chlorine or fluorine and Y may be chlorine or fluorine, for example, tetrafluoroethylene, chlorotrifluoroethylene, trifluoroethylene, 1,1-dichloro-2,2-difluoroethylene, and the like.

Further included are vinylethers having the formula $CH_2=CH-O-R$ wherein R is alkyl, straight chain or branched, having 1 to 10 carbon atoms, such as vinyl isobutylether, and the like.

Polymer of vinyl carbonate or copolymers thereof with up to about 30 mol percent of ethylenically unsaturated comonomers, as above described, are obtained by known polymerization methods which ordinarily yield the polymer in the form of granules or powder. They may be simply converted to the corresponding poly(hydroxymethylene) or the corresponding copolymers by suspending the granules or powder in aqueous or alcoholic alkali or concentrated aqueous ammonia, under heating, if desired, to precipitate the insoluble poly(hydroxymethylene) or corresponding copolymer. We have found that the vinylene carbonate precursor polymer is susceptable to oxidation in air and that, if the hydrolysis is conducted in aqueous alkali (for example, aqueous KOH), severe chain degradation may result. For that reason, it is preferred to conduct the alkaline hydrolysis in an inert atmosphere, e.g. under a blanket of nitrogen, helium, argon, or the like. More preferably, conversion of the precursor polymer to the poly(hydroxymethylene) or corresponding copolymer may be accomplished by hydrazinolysis, desirably in substantially anhydrous hydrazine, as herein defined, to obtain solutions thereof in hydrazine directly. From these solutions the poly(hydroxymethylene) or copolymer may be precipitated by addition of a non-solvent therefor, such as water.

Our invention is based on the surprising discovery that substantially anhydrous hydrazine which critically contains not more than about 10 percent by weight of water, desirably not more than about 6 percent by weight of water, based on the combined weight of water and hydrazine, is a good solvent for poly(hydroxymethylene) and of hydroxymethylene copolymers, even of high molecular weight, so that solutions thereof in such hydrazine at concentration of up to about 30 percent by weight, based on the weight of the solution, are readily prepared. We have found that the solvent power of hydrazine towards poly(hydroxymethylene) and of copolymers of hydroxymethylene with up to about 30 mol percent of ethylenically unsaturated comonomers decreases with increasing water content of the hydrazine, as is illustrated by the decrease of the rate of dissolution of poly(hydroxymethylene) in hydrazine with increasing water content for a given molecular weight poly(hydroxymethylene). We have found that to prepare a three percent solution of poly(hydroxymethylene) of even relatively low molecular weight indicated by inherent viscosity of 0.7 by slurrying it in solvent maintained at 80° C., the times required to effect solution were as shown in Table I below.

TABLE I

| Weight Percent N₂H₄ | Time Required for Dissolution |
| --- | --- |
| 95 | < 2 minutes |
| 80 | < 5 minutes |
| 70 | < 30 minutes |
| 60 | > 30 minutes |
| 50 | insoluble |

We further found that for a given water content of the hydrazine, the solubility of poly(hydroxymethylene) decreases with increasing molecular weight. For example, when one part each of poly(hydroxymethylene) of different molecular weight (indicated by its inherent viscosity) was treated with ten parts of 64 percent hydrazine at 80° C., the observations set forth in Table II, below, were made:

TABLE II

| Inherent Viscosity of Poly(hydroxymethylene) | Observation |
| --- | --- |
| 0.66 | Formed a tacky solution with a large amount of highly swollen gel particles. |
| 1.67 | A viscous gelatinous mass with considerable amount of gel particles, only partial solution. |
| 3.09 | Highly swollen rubbery mass, no solubility indicated. |

The results of Table II, above, indicated that even for a polymer of relatively low molecular weight having inherent viscosity of 0.66 a ten percent solution could not be prepared in hydrazine hydrate (which contains 64 percent $N_2H_4$), while poly(hydroxymethylene) of higher molecular weight is practically insoluble in hydrazine hydrate.

We have, however, found that substantially anhydrous hydrazine, say hydrazine containing not more than about 10 percent by weight of water, desirably not more than about 6 percent by weight of water, based on the combined weight of the hydrazine and water, is a good solvent for poly(hydroxymethylene) and of copolymers of hydroxymethylene with up to about 30 percent mol percent ethylenically unsaturated comonomers, regardless of molecular weight. Concentrated solutions of up to about 30 percent solids content or more are easily prepared. Such solutions have been found suitable for making films and for spinning into fibers. Discovery that solubility of poly(hydroxymethylene) in hydrazine should so drastically increase with decreasing water content of hydrazine was surprising inasmuch as poly(hydroxymethylene) is quite hydrophilic and capable of absorbing considerable amounts of water, in the order of up to about 30 percent by weight.

Solutions of poly(hydroxymethylene) and of copolymers of hydroxymethylene with ethylenically unsaturated comonomers in accordance with the present invention are simply prepared by suspending the polymer in substantially anhydrous hydrazine, with agitation and under gentle heating, if desired, until solution is effected.

The polymer solution thus obtained can serve as spinning solution for making filament (i.e. fibers and film) of the polymer by known methods of solution spinning, as by forcing the solution through an orifice in the form of a slot, if a film is desired, or through a spinneret if a fiber is desired, into a coagulating bath (spinning bath), which may be any liquid miscible with hydrazine which is a non-solvent for the polymer, optionally followed by washing and drying of the film or fiber thus obtained. Exemplary liquid media suitable to serve as coagulating bath include water, alcohols such as methanol and ethanol, and the like.

Fibers of poly(hydroxymethylene) obtained by spinning a solution thereof in substantially anhydrous hydrazine into water as above described can readily be oriented by conventional drawing methods to yield strong fibers of tenacity in the order of 3 to 7 grams/denier or more, which are characterized by high moduli (200–300 grams/denier). Since these fibers have hydrophilic properties, they are eminently suitable for fabrication into wearing apparel having appearance and properties similar to natural fibers of plant origin, such as cotton.

Inclusion of comonomers into the poly(hydroxymethylene) structure serves to enhance solubility of and tends to disrupt cystallinity of the poly(hydroxymethylene), thereby modifying properties such as flexibility, etc.

The following Examples further illustrate the present invention and set forth the best mode presently contemplated for its practice.

EXAMPLE I

This example illustrates hydrolysis of poly(vinylene carbonate) to form poly(hydroxymethylene).

Twenty grams of poly(vinylene carbonate) having an inherent viscosity of about 1.6 were suspended in 120 milliliters of a 50 percent aqueous potassium hydroxide solution by adding portions of the polymer to the agitated alkali solution. The resulting suspension was thoroughly agitated at high speed using a mechanical agitator, and was maintained under agitation for two hours at 70° C. The resulting clear foamy solution was poured into an excess of 1N HCl under constant stirring. The precipitated poly(hydroxymethylene) was washed with water and dried. There were obtained 18 grams of poly(hydroxymethylene) at 100 percent yield. The resulting poly(hydroxymethylene) was insoluble in phenol, 1,3-propane diamine, piperidine and asym. N,N-dimethylhydrazine. It was slightly swollen in 50 percent hydrazine, but readily soluble upon warming in 95 percent hydrazine to form a clear viscous solution.

EXAMPLE II

Example II illustrates spinning of a poly(hydroxymethylene) solution to form fiber.

The poly(hydroxymethylene) obtained in Example I above was dissolved in 95 percent hydrazine under agitation at about 70° C. to obtain a solution containing about 28–30 percent by weight of poly(hydroxymethylene). Upon cooling, the resulting solution was a clear, highly viscous liquid which would still flow at room temperature. This solution was spun into cold water using a hypodermic syringe. The fiber thus obtained was highly transparent, swollen and stretchable. It was washed in water and methanol and dried.

EXAMPLE III

Particulate poly(hydroxymethylene) having inherent viscosity of 1.67 was dissolved by adding it gradually to a stirred solution of 95 percent hydrazine maintained at 80° C. under an argon blanket to obtain a 15 percent solution within a period of about 1.5 hours. The resulting solution exhibited gel-solution transition at 42° C.

EXAMPLE IV

Finely powdered poly(hydroxymethylene) having inherent viscosity of 2.7 was added with stirring to 95 percent hydrazine maintained at 75° to 80° C. under an argon blanket. A 10.5 percent solution resulted, having gel-solution transition at 70° C.

EXAMPLE V

This example illustrates "hydrazinolysis" of poly(vinyl carbonate) to obtain a solution of poly(hydroxymethylene) in substantially anhydrous hydrazine.

Poly(vinylene carbonate) (25.8 g, 0.3 mol) of inherent viscosity=1.8 (DMF, 25° C.) was added slowly with stirring, to 200 ml of 95% hydrazine maintained at temperature of 80° C. under an inert atmosphere of argon. After the addition was completed in about 1 hour, the mixture was heated with stirring at 80° C. for an additional hour. The resultant highly viscous polymer solution was poured into 4 liters of water. The poly(hydroxymethylene) precipitated as a gel which was homogenized in a Waring blender, and was washed successively with deionized water, aqueous 1.0N HCl, deionized water and methanol. The polymer was finally dried in vacuum. Yield=18.0 g (100%). Inherent viscosity of the poly(hydroxymethylene)=3.09 (in 95% hydrazine at 25° C.)

When copolymers of vinyl carbonate with up to about 30 mol percent of ethylenically unsaturated comonomers are hydrolized in accordance with the procedure of Example I, above, then corresponding poly(hydroxymethylene) copolymers are obtained which are soluble in substantially anhydrous hydrazine. Their solution in substantially anhydrous hydrazine can be spun into filaments by extrusion into a spinning bath, as above illustrated for poly(hydroxymethylene).

Since various changes and modifications may be made in the invention without departing from the spirit and essential characteristics thereof, it is intended that all matter contained in the above description shall be interpreted as illustrative, only the invention being limited by the scope of the appended claims.

We claim:

1. A method for making filament including fibers and films of a polymer selected from the group consising of (a) poly(hydroxymethylene), (b) copolymers thereof with up to about 30 mol percent of ethylenically unsaturated comonomers, and (c) mixtures thereof which comprises introducing a spinning solution comprising a solution in hydrazine of said polymer, said spinning solution containing not more than about 10 percent by weight of water, based on the combined weight of the hydrazine and water, by means of a spinneret into a spinning bath comprising a hydrazine-miscible nonsolvent for said polymer to precipitate said polymer in filamentary form from the spinning solution.

2. The method of claim 1 wherein the spinning bath comprises water.

3. The method of claim 1 wherein the polymer is poly(hydroxymethylene) having inherent viscosity of at least 0.7 and present in said spinning solution in concentration of at least ten percent.

4. The method of claim 3 wherein the spinning bath comprises water and the polymer is precipitated in the spinning bath in fiber form.

5. The method of claim 3 wherein the spinning bath comprises water and the polymer is precipitated in the spinning bath in film form.

* * * * *